(12) United States Patent
Suzuki et al.

(10) Patent No.: US 10,645,636 B2
(45) Date of Patent: May 5, 2020

(54) TERMINAL APPARATUS, BASE STATION APPARATUS, COMMUNICATION METHOD, AND INTEGRATED CIRCUIT

(71) Applicant: SHARP KABUSHIKI KAISHA, Sakai, Osaka (JP)

(72) Inventors: Shoichi Suzuki, Sakai (JP); Tatsushi Aiba, Sakai (JP); Wataru Ohuchi, Sakai (JP); Takashi Hayashi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/075,567

(22) PCT Filed: Jan. 19, 2017

(86) PCT No.: PCT/JP2017/001743
§ 371 (c)(1),
(2) Date: Aug. 3, 2018

(87) PCT Pub. No.: WO2017/135052
PCT Pub. Date: Aug. 10, 2017

(65) Prior Publication Data
US 2019/0053131 A1 Feb. 14, 2019

(30) Foreign Application Priority Data
Feb. 4, 2016 (JP) .................. 2016-019541

(51) Int. Cl.
*H04W 4/00* (2018.01)
*H04W 48/14* (2009.01)
(Continued)

(52) U.S. Cl.
CPC ............. *H04W 48/14* (2013.01); *H04W 8/24* (2013.01); *H04W 24/08* (2013.01); *H04W 48/10* (2013.01);
(Continued)

(58) Field of Classification Search
None
See application file for complete search history.

(56) References Cited

U.S. PATENT DOCUMENTS

2010/0027466 A1  2/2010  Mustapha
2011/0128883 A1*  6/2011  Chung .................. H04B 7/155
                                                              370/252
(Continued)

OTHER PUBLICATIONS

Qualcomm, 5G Views on Technology & Standardization, 3GPP RAN workshop on 5G, Phoenix, USA, Sep. 2015, RWS-150012.
(Continued)

*Primary Examiner* — Phirin Sam
(74) *Attorney, Agent, or Firm* — ScienBiziP, P.C.

(57) ABSTRACT

A terminal apparatus transmits a system information request to request transmission of a first piece of on-demand SI among multiple pieces of on-demand SI, and monitors the first piece of on-demand SI based on transmission of a system information request to request transmission of the first piece of on-demand SI, the first piece of on-demand SI is monitored during a first window included in a monitoring window, a duration of the monitoring window is at least based on a transmission timing of a system information request to request transmission of the first piece of on-demand SI, and the first window is given at least based on information included in non-demand SI.

8 Claims, 9 Drawing Sheets

(51) Int. Cl.
*H04W 72/04* (2009.01)
*H04W 8/24* (2009.01)
*H04W 24/08* (2009.01)
*H04W 48/10* (2009.01)
H04W 48/20 (2009.01)
H04W 8/00 (2009.01)
H04W 48/16 (2009.01)
H04W 88/02 (2009.01)

(52) U.S. Cl.
CPC ........ *H04W 72/0446* (2013.01); *H04W 8/005* (2013.01); *H04W 48/16* (2013.01); *H04W 48/20* (2013.01); *H04W 88/02* (2013.01)

(56) References Cited

U.S. PATENT DOCUMENTS

| | | | | |
|---|---|---|---|---|
| 2014/0192672 | A1* | 7/2014 | Seo | H04W 24/10 370/252 |
| 2015/0382284 | A1* | 12/2015 | Brismar | H04W 74/04 370/329 |
| 2016/0234736 | A1* | 8/2016 | Kubota | H04W 36/0083 |
| 2017/0325194 | A1* | 11/2017 | Diachina | H04W 68/02 |
| 2018/0302846 | A1* | 10/2018 | Brismar | H04W 74/04 |
| 2019/0007945 | A1* | 1/2019 | Webb | H04W 4/70 |

OTHER PUBLICATIONS

Ericsson, "5G—key component of the Networked Society," RWS-150009, 3GPP RAN Workshop on 5G Phoenix, AZ, Sep. 17-18, 2015, RWS-150009.
3rd Generation Partnership Project; Technical Specification Group Radio Access Network; Evolved Universal Terrestrial Radio Access (E-UTRA); Radio Resource Control (RRC); Protocol specification (Release 13), 3GPP TS 36.331 V13.0.0 (Dec. 2015).
3rd Generation Partnership Project;Technical Specification Group Radio Access Network; Evolved Universal Terrestrial Radio Access (E-UTRA); Medium Access Control (MAC) protocol specification (Release 13) 3GPP TS 36.321 V13.0.0 (Dec. 2015).
3rd Generation Partnership Project; Technical Specification Group Radio Access Network; Evolved Universal Terrestrial Radio Access (E-UTRA); Physical layer procedures (Release 13) 3GPP TS 36.213 V13.0.0 (Dec. 2015).
3rd Generation Partnership Project;Technical Specification Group Radio Access Network; Evolved Universal Terrestrial Radio Access (E-UTRA); Multiplexing and channel coding (Release 13) 3GPP TS 36.212 V13.0.0 (Dec. 2015).
3rd Generation Partnership Project; Technical Specification Group Radio Access Network; Evolved Universal Terrestrial Radio Access (E-UTRA); Physical channels and modulation (Release 13) 3GPP TS 36.211 V13.0.0 (Dec. 2015).
NEC, "LTE BCH-on-demand", R2-062930, TSG-RAN Working Group2#55, Oct. 9-13, 2006, Seoul, Korea.

* cited by examiner

US 10,645,636 B2

TERMINAL APPARATUS, BASE STATION APPARATUS, COMMUNICATION METHOD, AND INTEGRATED CIRCUIT

TECHNICAL FIELD

An embodiment of the present invention relates to a terminal apparatus, a base station apparatus, a communication method, and an integrated circuit.

BACKGROUND ART

In the 3rd Generation Partnership Project (3GPP), a radio access method for 4th generation cellular mobile communications (hereinafter, referred to as "Long Term Evolution (LTE, trade name)", or "Evolved Universal Terrestrial Radio Access (EUTRA)") has been standardized (NPL 1, 2, 3, 4, 5).

In the 3GPP, a discussion about a radio access method for 5th generation cellular mobile communications (hereinafter, referred to as "NX") started (NPL 6, 7). In the 3GPP, a method with which a base station apparatus transmits NX system information has been discussed.

CITATION LIST

Non Patent Literature

NPL 1: "3GPP TS 36.211 V13.0.0 (2015-12)", 6 Jan. 2016.
NPL 2: "3GPP TS 36.212 V13.0.0 (2015-12)", 6 Jan. 2016.
NPL 3: "3GPP TS 36.213 V13.0.0 (2015-12)", 6 Jan. 2016.
NPL 4: "3GPP TS 36.321 V13.0.0 (2015-12)", 14 Jan. 2016.
NPL 5: "3GPP TS 36.331 V13.0.0 (2015-12)", 7 Jan. 2016.
NPL 6: "5G—key component of the Networked Society", RWS-150009, Ericsson, 3GPP RAN Workshop on 5G, Phoenix, USA, 17-18 Sep. 2015.
NPL 7: "5G Views on Technology & Standardization", RWS-150012, Qualcomm, 3GPP RAN Workshop on 5G, Phoenix, USA, 17-18 Sep. 2015.

SUMMARY OF INVENTION

Technical Problem

An embodiment of the present invention provides a radio communication system in which system information is efficiently transmitted, a base station apparatus of the radio communication system, the base station apparatus of the radio communication system, a communication method used for the terminal apparatus, a communication method used for the base station apparatus, an integrated circuit mounted on the terminal apparatus, and an integrated circuit mounted on the base station apparatus.

Solution to Problem (1) According to some aspects of the present invention, the following measures are provided. That is, a first aspect of the present invention is a terminal apparatus that includes a transmitter for transmitting a system information request to request transmission of a first piece of on-demand SI among multiple pieces of on-demand SI, and a receiver for monitoring the first piece of on-demand SI based on transmission of a system information request to request transmission of the first piece of on-demand SI, wherein the first piece of on-demand SI is monitored during a first window included in a monitoring window, a duration of the monitoring window is at least based on a transmission timing of a system information request to request transmission of the first piece of on-demand SI, and the first window is given at least based on information included in non-demand SI.

(2) A second aspect of the present invention is a base station apparatus that includes a receiver for receiving a system information request to request transmission of a first piece of on-demand SI among multiple pieces of on-demand SI, and a transmitter for transmitting the first piece of on-demand SI based on reception of a system information request to request transmission of the first piece of on-demand SI, wherein the first piece of on-demand SI is transmitted during a first window included in a monitoring window, a duration of the monitoring window is at least based on a reception timing of a system information request to request transmission of the first piece of on-demand SI, and the first window is given at least based on information included in non-demand SI.

(3) A third aspect of the present invention is a communication method used for a terminal apparatus, wherein the method includes transmitting a system information request to request transmission of a first piece of on-demand SI among multiple pieces of on-demand SI, and monitoring the first piece of on-demand SI based on transmission of a system information request to request transmission of the first piece of on-demand SI, wherein the first piece of on-demand SI is monitored during a first window included in a monitoring window, a duration of the monitoring window is at least based on a transmission timing of a system information request to request transmission of the first piece of on-demand SI, and the first window is given at least based on information included in non-demand SI.

(4) A fourth aspect of the present invention is a communication method used for a base station apparatus, wherein the method includes receiving a system information request to request transmission of a first piece of on-demand SI among multiple pieces of on-demand SI, and transmitting the first piece of on-demand SI based on reception of a system information request to request transmission of the first piece of on-demand SI, the first piece of on-demand SI is transmitted during a first window included in a monitoring window, a duration of the monitoring window is at least based on a reception timing of a system information request to request transmission of the first piece of on-demand SI, and the first window is given at least based on information included in non-demand SI.

(5) A fifth aspect of the present invention is an integrated circuit mounted in a terminal apparatus, wherein the integrated circuit includes a transmission circuit for transmitting a system information request to request transmission of a first piece of on-demand SI among multiple pieces of on-demand SI, and a reception circuit for monitoring the first piece of on-demand SI based on transmission of a system information request to request transmission of the first piece of on-demand SI, the first piece of on-demand SI is monitored during a first window included in a monitoring window, a duration of the monitoring window is at least based on a transmission timing of a system information request to request transmission of the first piece of on-demand SI, and the first window is given at least based on information included in non-demand SI.

(6) A sixth aspect of the present invention is an integrated circuit mounted in a base station apparatus, wherein the integrated circuit includes a reception circuit for receiving a system information request to request transmission of a first piece of on-demand SI among multiple pieces of on-demand SI, and a transmission circuit for transmitting the first piece of on-demand SI based on reception of a system information request to request transmission of the first piece of on-demand SI, the first piece of on-demand SI is transmitted during a first window included in a monitoring window, a duration of the monitoring window is at least based on a reception timing of a system information request to request transmission of the first piece of on-demand SI, and the first window is given at least based on information included in non-demand SI.

Advantageous Effects of Invention

According to this invention, system information is effectively transmitted.

DESCRIPTION OF EMBODIMENTS

Embodiments of the present invention will be described below.

Figure 1:
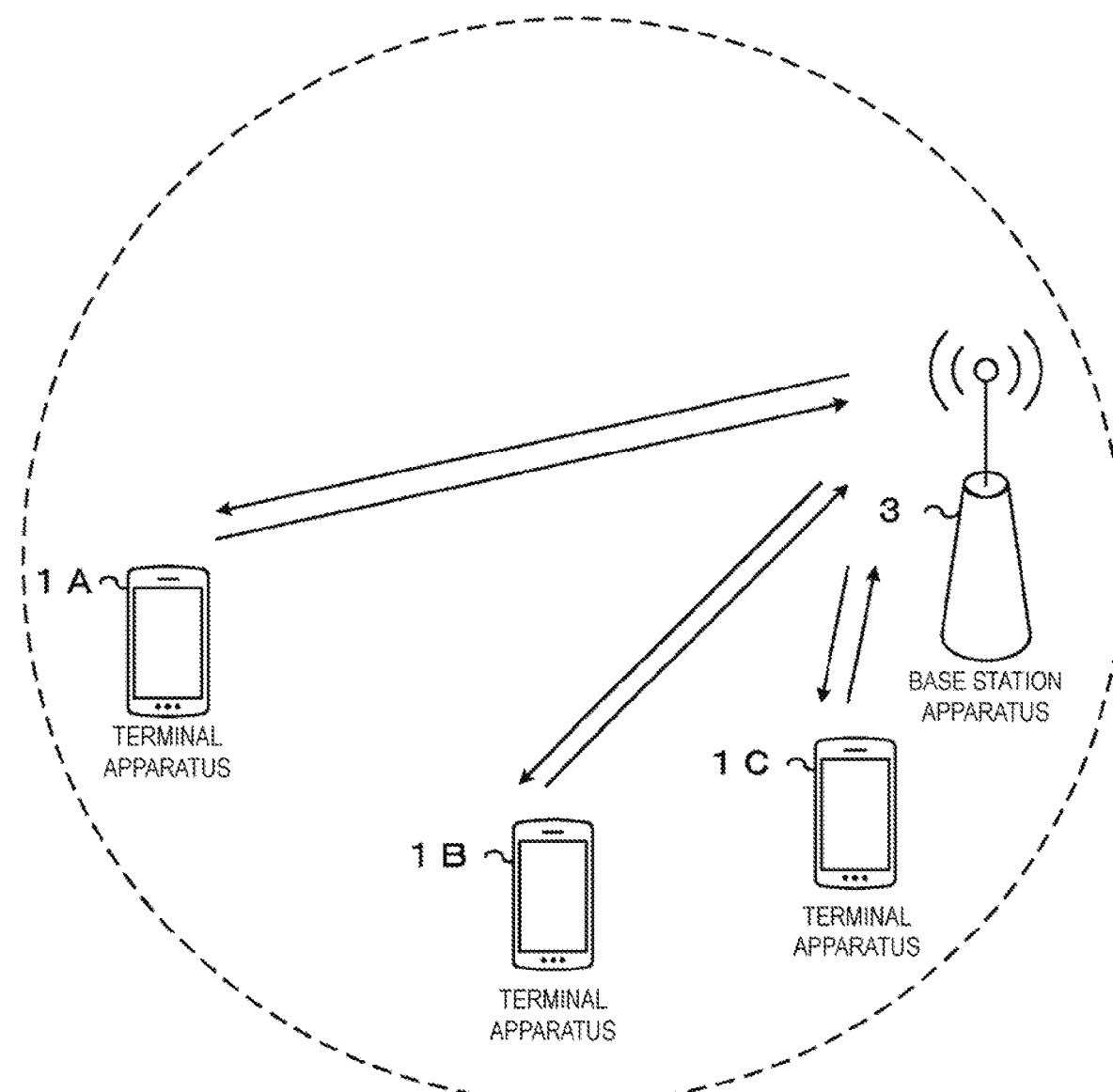
FIG. 1 is a conceptual diagram of a radio communication system according to the present embodiment.

FIG. 1 is a conceptual diagram of a radio communication system according to the present embodiment. In FIG. 1, a radio communication system includes a terminal apparatus 1A, a terminal apparatus 1B, a terminal apparatus 1C, and the base station apparatus 3. The base station apparatus 3 may include a core network apparatus. The terminal apparatus 1A, the terminal apparatus 1B, and the terminal apparatus 1C are collectively referred to as a terminal apparatus 1.

A state of the terminal apparatus 1 may be changed from RRC_IDLE to RRC_CONNECTED by a connection establishment procedure. A state of the terminal apparatus 1 may be changed from RRC_CONNECTED to RRC_IDLE by a connection release procedure.

The terminal apparatus 1 in RRC_IDLE may select one cell with a cell selection procedure and camp on the selected one cell.

One or multiple serving cells may be configured for the terminal apparatus 1 in RRC_CONNECTED. A technology in which the terminal apparatus 1 communicates via multiple serving cells is referred to as cell aggregation or carrier aggregation. An embodiment of the present invention may be applied to each of the multiple serving cells configured for the terminal apparatus 1. Furthermore, an embodiment of the present invention may be applied to some of the configured multiple serving cells. Furthermore, an embodiment of the present invention may be applied to each of groups of the configured multiple serving cells. Furthermore, an embodiment of the present invention may be applied to some of the groups of the configured multiple serving cells. In carrier aggregation, the configured multiple serving cells are also referred to as aggregated serving cells.

The configured multiple serving cells may include one primary cell and one or multiple secondary cells. The primary cell is a cell in which an initial connection establishment procedure has been performed, a cell in which a connection re-establishment procedure has started, or a cell indicated as a primary cell in a handover procedure. At the point in time when a Radio Resource Control (RRC) connection is established, or later, a secondary cell may be configured.

A carrier corresponding to a serving cell in a downlink is referred to as a downlink component carrier. A carrier corresponding to a serving cell in an uplink is referred to as an uplink component carrier. The downlink component carrier and the uplink component carrier are collectively referred to as a component carrier.

The terminal apparatus 1 can perform simultaneous transmission on multiple physical channels/of multiple physical signals in the multiple serving cells (component carriers) to be aggregated. The terminal apparatus 1 can perform simultaneous reception on multiple physical channels/of multiple physical signals in the multiple serving cells (component carriers) to be aggregated.

Figure 2:
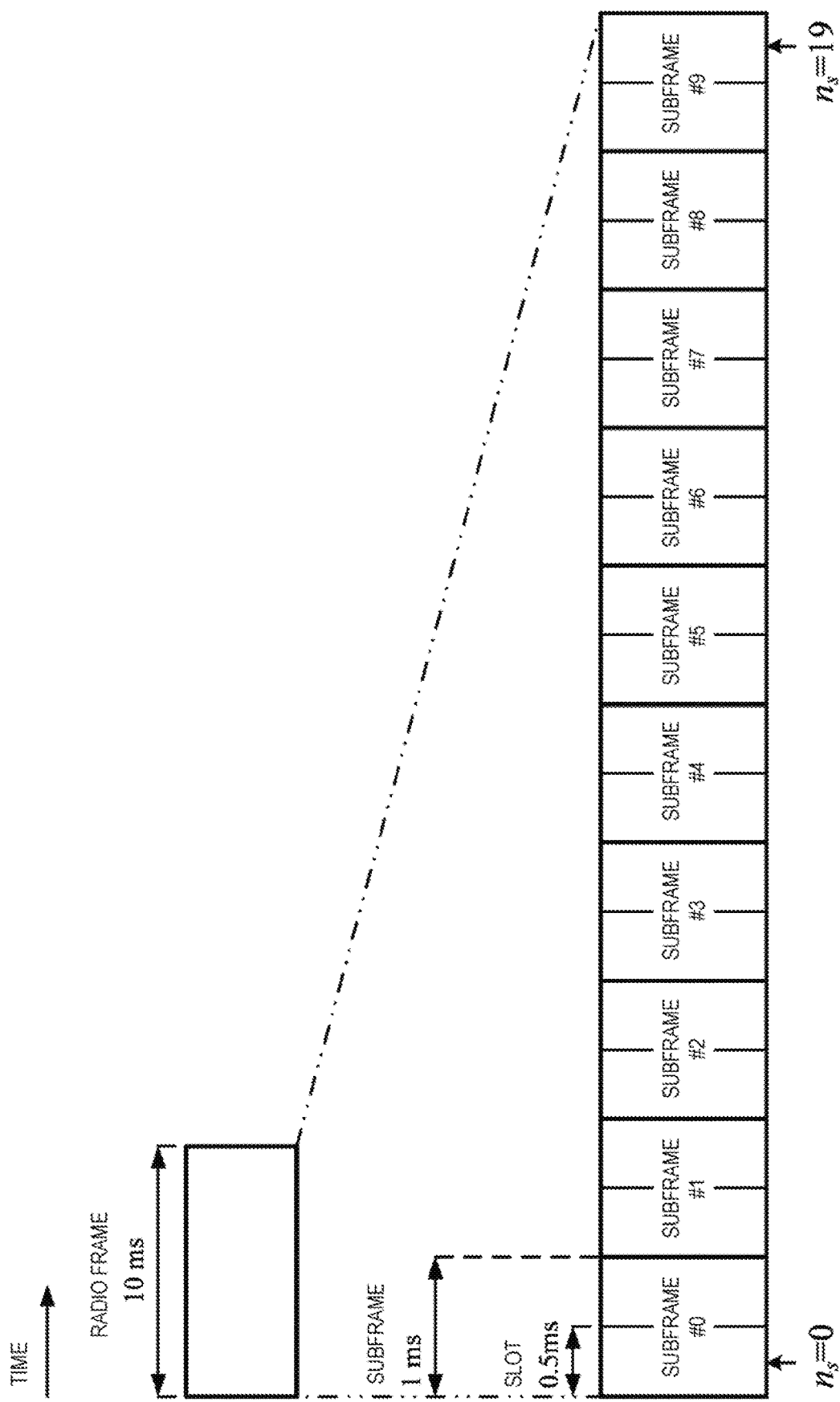
FIG. 2 is a diagram illustrating an example of a configuration of a radio frame according to the present embodiment.

FIG. 2 is a diagram illustrating an example of a configuration of a radio frame according to the present embodiment. In FIG. 2, a horizontal axis is a time axis.

Each of the radio frames may include ten contiguous subframes in a time domain. Each subframe i may include two contiguous slots in the time domain. The two contiguous slots in the time domain may be a slot having a slot number $n_s$ of 2i in the radio frame and a slot having a slot number $n_s$ of 2i+1 in the radio frame respectively. Each of the radio frames may include ten contiguous subframes in the time domain. Each of the radio frames may include 20 contiguous slots ($n_s$=0, 1 . . . , 19) in the time domain. The configuration of the above-described radio frame may be applied to both the uplink and the downlink.

Figure 3:
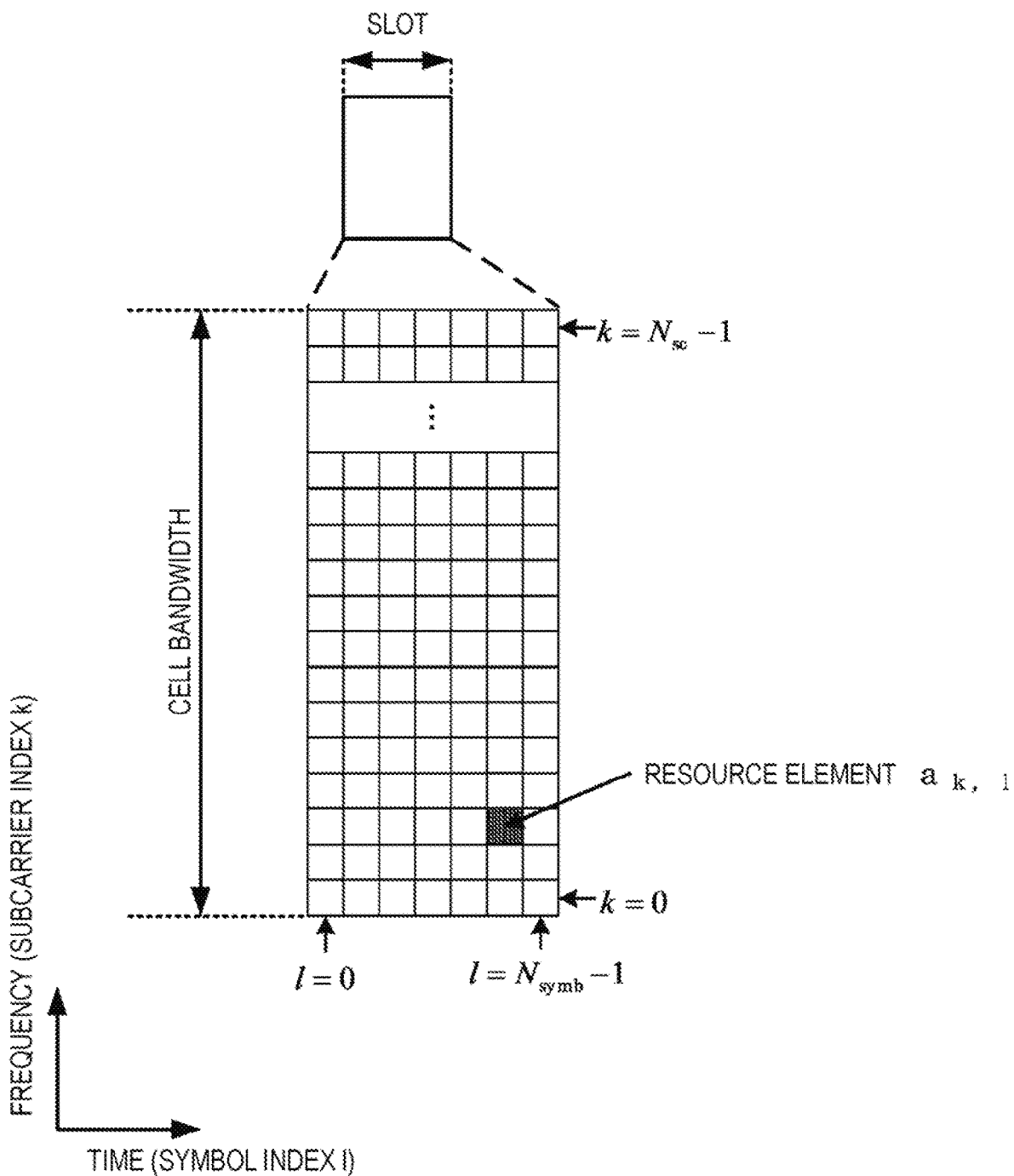
FIG. 3 is a diagram illustrating a schematic configuration of a slot according to the present embodiment.

A configuration of the slot in the present embodiment will be described below. FIG. 3 is a diagram illustrating a schematic configuration of the slot according to the present embodiment. FIG. 3 illustrates a configuration of a slot in one serving cell. In FIG. 3, a horizontal axis is a time axis, and a vertical axis is a frequency axis. In FIG. 3, 1 is a symbol number/index, and k is a subcarrier number/index. Here, a symbol may be an Orthogonal Frequency Division Multiplexing (OFDM) symbol, or a Single Carrier Frequency Division Multiple Access (SC-FDMA) symbol. $N_{sc}$ is a total number of subcarriers included in a cell bandwidth. $N_{symb}$ is a total number of symbols included in one slot. $N_{symb}$ may be given based on a subcarrier spacing.

A physical signal or a physical channel transmitted in each of the slots is expressed by a resource grid. The resource grid is defined by multiple subcarriers and multiple symbols. Each element within the resource grid is referred to as a resource element. A resource element $a_{k,l}$ is expressed by a subcarrier number/index k and a symbol number/index 1. That is, a resource for transmitting the physical signal or the physical channel may be expressed by the resource element.

The resource grid may be defined for each antenna port. In the present embodiment, description is given for one antenna port. The present embodiment may be applied to each of multiple antenna ports.

System information in the present embodiment will be described.

A Radio Resource Control (RRC) layer has a function for broadcasting system information. The system information may include (a) Non Access Stratum (NAS) common information, (b) information applicable to the terminal apparatus 1 in RRC_IDLE, (c) information applicable to the terminal apparatus 1 in RRC_CONNECTED, (d) information applicable to both the terminal apparatus 1 in RRC_IDLE and the terminal apparatus 1 in RRC_CONNECTED, (e) an Earthquake and Tsunami Warning System (ETWS) notification, and (f) a CommercialMobile Alert Service (CMAS) notification. The information applicable to the terminal apparatus 1 in RRC_IDLE may include a parameter for the cell selection procedure, a parameter for cell re-selection, and information of a neighbor cell. The information applicable to the terminal apparatus 1 in RRC_CONNECTED and the information applicable to both the terminal apparatus 1 in RRC_IDLE and the terminal apparatus 1 in RRC_CONNECTED may include information for a channel configuration common to multiple terminal apparatuses 1. The ETWS notification and the CMAS notification may include information for indicating a warning type. The warning type may correspond to an earthquake or a tsunami.

The system information may be divided into multiple information blocks. The information block may be referred to as a Master Information Block (MIB) and a System Information Block (SIB). One or multiple information blocks may be transmitted using a system information message.

Hereinafter, an example of the information block will be described. Multiple information blocks may include the following SI type A to SI type O. Information included in the following SI type A to SI type O may be included in different information blocks. Information other than the information included in the following SI type A to SI type O may be included in any one of the following SI type A to SI type.

The SI type A includes information necessary to acquire system information other than the SI type A from a cell. The SI type A may include information for indicating a transmission bandwidth configuration of a cell in the downlink, and information for indicating a System Frame Number (SFN). The SFN denotes a radio frame number.

The SI type B includes information used for evaluating whether the terminal apparatus 1 is allowed to access to a cell or not.

The SI type C may include information for a channel configuration for transmitting a system information request. The system information request is information for requesting transmission of specific system information (a specific SI type, a group of specific SI types) to a cell (base station apparatus 3). The specific system information is referred to as on-demand SI (System Information).

The SI type D includes information associated with scheduling of other system information. The information associated with the scheduling of other system information may include information for indicating a time window in which an SI type other than the SI type C is transmitted. The time window may be defined for each SI type. The SI type D may indicate a set of subframes in which a certain SI type can be transmitted, and/or a set of subframes in which the certain SI type cannot be transmitted. The set of subframes may be common to multiple SI types.

The SI type E includes information for a radio resource configuration common to multiple pieces of UE.

The SI type F includes information for cell re-selection in an intra Radio Access Technology.

The SI type G includes information for cell re-selection in a first inter Radio Access Technology.

The SI type H includes information for cell re-selection in a second inter Radio Access Technology.

The SI type I includes the ETWS notification.

The SI type J includes the CMAS notification.

The SI type K includes information necessary to acquire information of a Multimedia Broadcast Multicast Service (MBMS). The MBMS is a function for providing a multicast service. Multiple cells (base station apparatuses 3) may simultaneously broadcast multicast service data in an identical frequency/time resource. The multicast service data may be broadcast by one cell (base station apparatus 3).

The SI type L includes information associated with a Global Positioning System (GPS) time, and a Coordinated Universal Time (UTC). The terminal apparatus 1 may use information included in the SI type L in order to acquire UTC, GPS (coordinates, a geographical position), and a local time.

The SI type M includes information for traffic steering between a cellular network (e.g., NX) and a Wireless Local Area Network (WLAN).

The SI type N includes information for indicating that a cell (base station apparatus 3) supports a sidelink communication procedure. The SI type N may include information for configuring a resource associated with sidelink direct communication.

The SI type O includes information for indicating that a cell (base station apparatus 3) supports a sidelink discovery procedure. The SI type O may include information for configuring a resource associated with sidelink direct discovery.

A sidelink is an interface between the terminal apparatuses 1 for the sidelink communication and the sidelink discovery. The sidelink communication is an Access Stratum (AS) function enabling proximity based services (ProSe) direct communication among multiple neighboring terminal apparatuses 1. The ProSe direct communication is communication among the multiple neighboring terminal apparatuses 1 via a path through which no network node passes.

The sidelink discovery is an AS function enabling proximity based services (ProSe) direct discovery. The ProSe direct discovery is defined as a process/procedure for detecting and specifying another neighboring terminal apparatus 1 using a direct radio signal.

The SI type D may include information for indicating transmission of a specific SI type supported by a cell (base station apparatus 3) and/or a specific function supported by a cell (base station apparatus 3). For example, the SI type D may include information for indicating that a cell (base station apparatus 3) supports the sidelink communication and/or transmission of the SI type N associated with the sidelink communication.

The system information may be classified into on-demand SI (System Information) and non-demand SI (System Information). On-demand SI is system information transmitted by the base station apparatus 3 based on reception/detection of a system information request from the terminal apparatus 1. Non-demand SI is system information transmitted by the base station apparatus 3 regardless of reception/detection of the system information request from the terminal apparatus 1. Non-demand SI may be transmitted periodically. Non-demand SI may be transmitted at a timing (subframe) predetermined by a specification or the like. A first piece of non-demand SI may be transmitted at a timing (subframe) indicated by a second piece of non-demand SI.

The above-described SI type A to SI type O may be on-demand SI. The above-described SI type A to SI type O may be non-demand SI. Some of the above-described SI type A to SI type O may be on-demand SI and the others may be non-demand SI. The SI type A, the SI type B, the SI type C, the SI type D, and the SI type I may be non-demand SI and the other SI types may be on-demand SI.

Physical channels and physical signals in the present embodiment will be described.

In FIG. 1, the following downlink physical channels are used for downlink radio communication from the base station apparatus 3 to the terminal apparatus 1. The downlink physical channels are used by a physical layer for transmitting information output from higher layers.

NX-PBCH (NX Physical Broadcast CHannel)
NX-PDCCH (NX Physical Downlink Control CHannel)
NX-PDSCH (NX Physical Downlink Shared CHannel)

The NX-PBCH may be used to broadcast non-demand SI.

The NX-PDCCH is used for transmitting downlink control information used for scheduling the NX-PDSCH (Narrow Band Downlink Control Information (DCI)), and downlink control information used for scheduling an NX-PUSCH (Narrow Band Physical Uplink Shared CHannel).

The NX-PDSCH is used for transmitting downlink data (Downlink Shared CHannel (DL-SCH)). The NX-PDSCH may be used for transmitting downlink control information. The NX-PDSCH may be used for transmitting the downlink control information together with the downlink data. The terminal apparatus 1 may decode the NX-PDSCH based on reception/detection of the downlink control information (NX-PDCCH, NX-PDSCH). The terminal apparatus 1 may decode the NX-PDSCH regardless of the reception/detection of the downlink control information (NX-PDCCH, NX-PDSCH).

The downlink data may include on-demand SI and non-demand SI. On-demand SI and non-demand SI may be transmitted on the different NX-PDSCHs. That is, the on-demand SI and the non-demand SI are not necessarily transmitted on an identical NX-PDSCH.

In FIG. 1, the following downlink physical signals are used for downlink radio communication from the base station apparatus 3 to the terminal apparatus 1. The downlink physical signals are not used for transmitting information output from a higher layer, but are used by a physical layer.

NX-SS (NX Synchronization Signal)
NX-DL RS (NX Downlink Reference Signal)

The NX-SS may be used for cell search. The cell search is a procedure in which the terminal apparatus 1 acquires time and frequency synchronization with a cell and detects a Physical layer Cell Identity (PCI) of the cell. In a handover procedure, a PCI of a target cell may be notified from a source cell (base station apparatus 3) to the terminal apparatus 1. A handover command may include information for indicating the PCI of the target cell. The NX-SS may be transmitted periodically. The NX-SS may be referred to as a discovery signal (DS).

The NX-DL RS may be used in order for the terminal apparatus 1 to perform channel compensation on a downlink physical channel of a cell. The NX-DL RS may be used in order for the terminal apparatus 1 to calculate downlink channel state information of a cell.

In FIG. 1, the following uplink physical channels are used for uplink radio communication from the base station apparatus 3 to the terminal apparatus 1. The uplink physical channels are used by a physical layer for transmitting information output from higher layers.

NX-PRACH (NX Physical Random Access CHannel)
NX-PUCCH (NX Physical Uplink Control CHannel)
NX-PUSCH (NX Physical Uplink Shared CHannel)

The NX-PRACH is used for transmitting a preamble (preamble sequence). The NX-PRACH may be used for a random access procedure. The NX-PRACH may also be used for transmitting a system information request. That is, the system information request may be a preamble.

A set of NX-PRACH resources for a random access procedure, and a set of NX-PRACH resources for transmitting a system information request may be individually configured. Information for indicating the set of NX-PRACH resources for the random access procedure may be included in on-demand SI. Information for indicating the set of NX-PRACH resources for transmitting the system information request may be included in non-demand SI.

A preamble may be given by performing a cyclic shift on a Zadoff-Chu sequence corresponding to a physical route sequence index u. The Zadoff-Chu sequence is generated based on the physical route sequence index u. Multiple preambles may be defined in a cell. A preamble may be specified by a preamble index. Different preambles corresponding to different preamble indices correspond to different combinations of a physical route sequence index u and a cyclic shift.

A physical route sequence index u and a cyclic shift corresponding to a preamble corresponding to a system information request may be given at least based on information included in non-demand SI and/or a PCI. A physical route sequence index u and a cyclic shift corresponding to a preamble corresponding to a random access procedure, may be given at least based on information included in on-demand SI and/or the PCI.

A preamble corresponding to a system information request may be transmitted on a physical channel other than the NX-PRACH.

A Zadoff-Chu sequence $x_u(n)$ corresponding to a physical route sequence index u is given by Equation (1) below. e is the Napier's constant. $N_{zc}$ is a length of the Zadoff-Chu sequence $X_u(n)$. n is an integer incremented from 0 to $N_{zc}-1$.

$$x_u(n) = e^{-j\frac{\pi u n(n+1)}{N_{ZC}}}, 0 \le n \le N_{ZC} - 1 \qquad \text{[Equation 1]}$$

A preamble (preamble sequence) $x_{u,v}(n)$ is given by Equation (2) below. $C_v$ is a value of a cyclic shift. X mod Y is a function outputting a remainder obtained by dividing X by Y.

$$x_{u,v}(n) = x_u((n+C_v) \bmod N_{ZC}) \qquad \text{[Equation 2]}$$

The NX-PUCCH may be used for transmitting uplink control information. The uplink control information may include Hybrid Automatic Repeat reQuest ACKnowledgment (HARQ-ACK) and channel state information corresponding to the NX-PDSCH (downlink data).

The NX-PUSCH may be used for transmitting uplink data (UpLink-Shared CHannel (UL-SCH)) and/or uplink control information. The uplink data may include a system information request.

In FIG. 1, the following uplink physical signals are used for uplink radio communication from the base station apparatus 3 to the terminal apparatus 1. The uplink physical signal is not used for transmission of information output from the higher layer, but is used by the physical layer.

NX-UL RS (Narrow Band Downlink Reference Signal)

The NX-UL RS may be used in order for the base station apparatus 3 to perform channel compensation of uplink physical channel.

The downlink physical channels and the downlink physical signals are collectively referred to as a downlink signal. The uplink physical channels and the uplink physical signals are collectively referred to as an uplink signal. The downlink physical channels and the uplink physical channels are collectively referred to as a physical channel. The downlink physical signals and the uplink physical signals are collectively referred to as a physical signal.

The DL-SCH is a transport channel. A channel used in a Medium Access Control (MAC) layer is referred to as a transport channel. A unit of the transport channel used in the MAC layer is also referred to as a transport block (TB) or a MAC Protocol Data Unit (PDU). A Hybrid Automatic Repeat reQuest (HARQ) is controlled for each transport block in the MAC layer. The transport block is a unit of data that the MAC layer delivers to the physical layer. In the physical layer, the transport block is mapped to a codeword and subjected to coding processing on a codeword-by-codeword basis.

The transport block may include data of a Signalling Radio Bearer (SRB), and data of a Data Radio Bearer (DRB). The SRB is defined as a radio bearer used only for transmitting a Radio Resource Control (RRC) message and a Non Access Stratum (NAS) message. The DRB is defined as a radio bearer for transmitting user data.

The base station apparatus 3 and the terminal apparatus 1 exchange (transmit and/or receive) a signal in the higher layer. For example, the base station apparatus 3 and the terminal apparatus 1 may transmit and/or receive, in a Radio Resource Control (RRC) layer, RRC signalling (also referred to as a Radio Resource Controlmessage (RRC message) or Radio Resource Control information (RRC information)). Furthermore, the base station apparatus 3 and the terminal apparatus 1 may transmit and/or receive, in the Medium Access Control (MAC) layer, a MAC Control Element (CE). Here, the RRC signalling and/or the MAC CE is also referred to as higher layer signaling.

Hereinafter, a channel configuration for transmitting a system information request will be described.

The channel configuration for transmitting a system information request may be common to multiple terminal apparatuses 1. Non-demand SI may include information for configuring a channel for transmitting a system information request. The information for configuring a channel for transmitting a system information request may include some or all of the following information A to information I.

Figure 4:
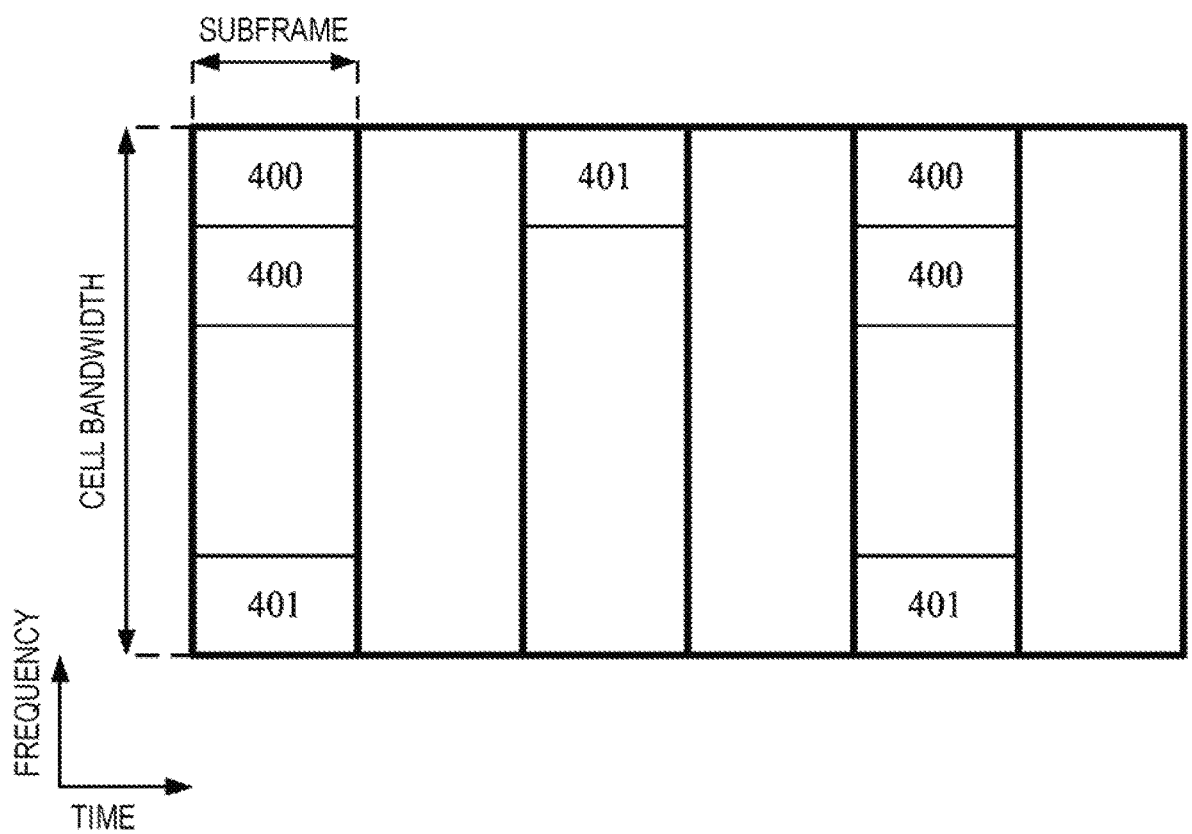
FIG. 4 is a diagram illustrating an example of a set of resources for transmitting a system information request in the present embodiment.

Information A: Information for indicating whether a system information request is transmitted as a preamble, a message, or both the preamble and the message Information B: Information for indicating a frequency/time resource for transmitting a system information request Information C: Information for indicating a length of a Zadoff-Chu sequence corresponding to a preamble Information D: Information for indicating a physical route sequence index u corresponding to a preamble Information E: Information for indicating a cyclic shift applied to a Zadoff-Chu sequence corresponding to a preamble Information F: Information for indicating subcarrier spacings of a channel used for transmitting a system information request Information G: Information for indicating a length of a Cyclic Prefix (CP) applied to a preamble Information H: Information for indicating the number of times that a preamble or a message is repeatedly transmitted in one transmission instance of a system information request Information I: Information for indicating a parameter used for setting transmit power for transmitting a system information request FIG. 4 is a diagram illustrating an example of a set of resources for transmitting a system information request in the present embodiment. In FIG. 4, the horizontal axis represents a time axis, and the vertical axis represents a frequency axis. A reference sign 700 denotes a resource belonging to a first set. A reference sign 701 denotes a resource belonging to a second set. A resource 700 may correspond to a first SI type, or a first group to which multiple SI types belong. A resource 701 may correspond to a second SI type, or a second group to which multiple SI types belong. The first group and the second group may include identical SI types. Note that, the first group and the second group may include different SI types.

Figure 5:
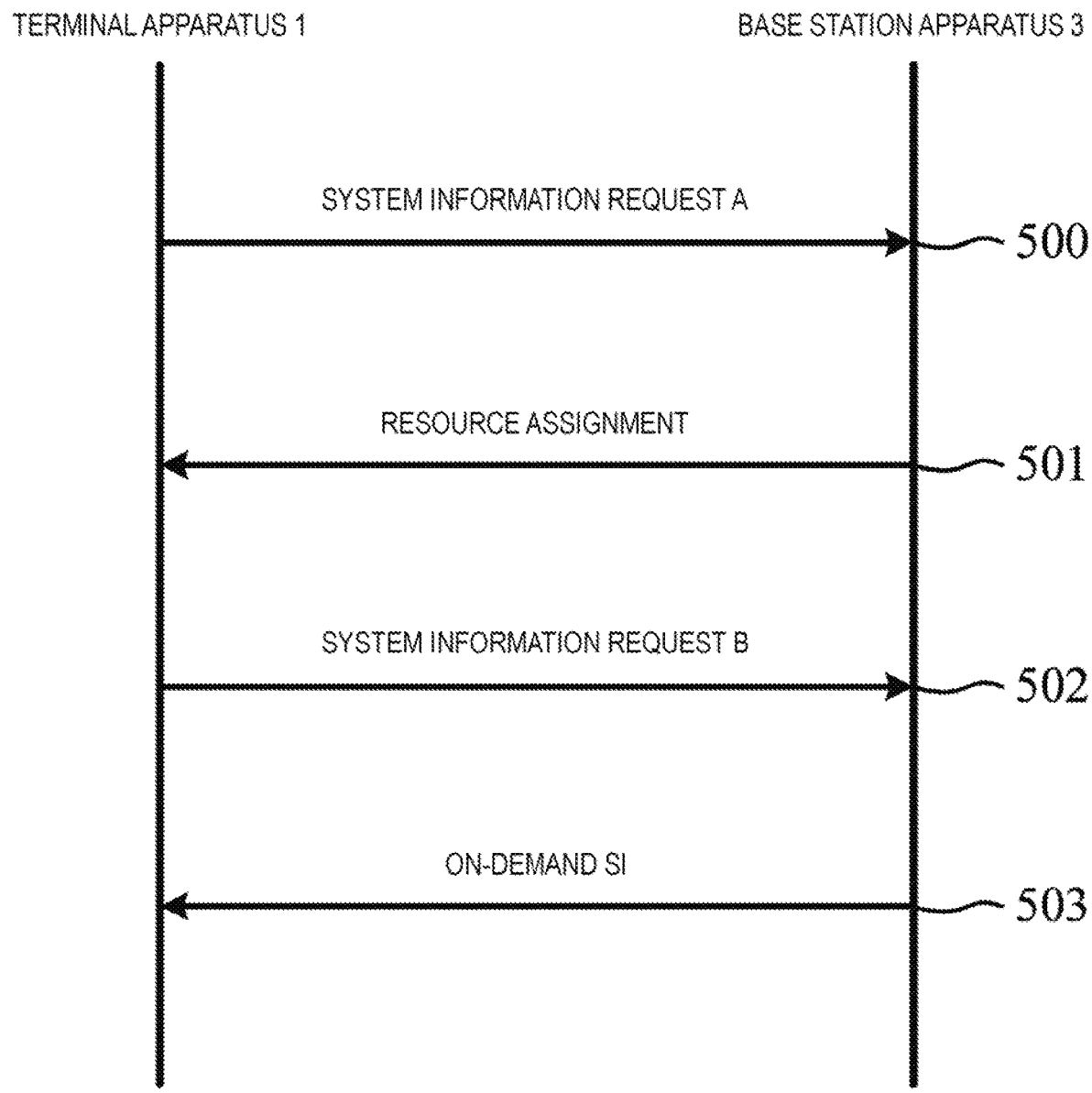
FIG. 5 is a sequence diagram illustrating an example of a procedure for a system information request in the present embodiment.

Transmission of a system information request may be divided into transmission of a system information request A and transmission of a system information request B. FIG. 5 is a sequence diagram illustrating an example of a procedure for a system information request in the present embodiment. In 500, the terminal apparatus 1 transmits the system information request A to the base station apparatus 3. The system information request A may be a preamble transmitted on the NX-PRACH. In 501, the base station apparatus 3 transmits information for assigning a resource (resource assignment) corresponding to the received preamble. In 502, the terminal apparatus 1 transmits the system information request B based on the received resource assignment. The system information request B may include a message (information bit) for indicating an SI type (information block) to which the system information request corresponds. In 503, the base station apparatus 3 may transmit on-demand SI of the SI type indicated by the system information request B, based on reception of the system information request B.

Hereinafter, system information update will be described.

The base station apparatus 3 may transmit a system information change. A system information change may indicate that on-demand SI and/or non-demand SI will be updated. A system information change may indicate that on-demand SI and/or non-demand SI was updated. Non-demand SI may include information for indicating that a timing at which on-demand SI and non-demand SI will be updated.

Non-demand SI may include information for indicating a subframe for monitoring a system information change.

A system information change is not included in non-demand SI. A system information change may be included in on-demand SI. A system information change may be included in the NX-PDCCH or the NX-PDSCH. A system information change and/or on-demand SI may indicate SI types to be updated. The terminal apparatus 1 may attempt to decode on-demand SI for indicating SI types to be updated, based on reception of a system information change.

In a case that a system information change and/or on-demand SI indicates on-demand SI update of interest, the terminal apparatus 1 may transmit a system information request corresponding to the on-demand SI of interest.

A method for deciding an SI type (information block) to which a system information request corresponds will be described.

A system information request may include a message (information bit) for indicating an SI type (information block) to which the system information request corresponds. In this case, the system information request may be included in uplink data and transmitted on the NX-PUSCH. The terminal apparatus 1 may set a value of the message (information bit), based on an SI type that the terminal apparatus 1 requests the base station apparatus 3 to transmit. The base station apparatus 3, based on reception of the message (information bit), may transmit an SI type corresponding to the value of the information bit. The message (information bit) may be transmitted on the NX-PUSCH.

A system information request may include the above-described preamble. In a case that a system information request is a preamble, an SI type (information block) to which the system information request corresponds may be given by a preamble index (a physical route sequence index u and a cyclic shift $C_v$). The terminal apparatus 1, based on an SI type that the terminal apparatus 1 requests the base station apparatus 3 to transmit, may decide a preamble index (a physical route sequence index u, and a cyclic shift $C_v$). The base station apparatus 3, based on reception of a preamble corresponding to the preamble index (the physical route sequence index u, and the cyclic shift $C_v$) may transmit an SI type corresponding to the preamble index. Non-demand SI may include information for indicating correspondence between a preamble index (a physical route sequence index u, and a cyclic shift $C_v$) and an SI type.

An SI type (information block) to which a system information request corresponds may be given by a resource to which the system information request is transmitted. The base station apparatus 3 may transmit non-demand SI for indicating multiple sets of resources for transmitting a system information request. Each of the multiple sets may correspond to a different SI type. That is, for each of SI types to which the system information request corresponds, a set of resources may be configured. For example, a first set of resources for transmitting a system information request corresponding to a first SI type and a second set of resources for transmitting a system information request corresponding to a second SI type may be individually configured.

The terminal apparatus 1 may select one set from the multiple sets, based on an SI type that the terminal apparatus 1 requests the base station apparatus 3 to transmit. The terminal apparatus 1 may select one resource from the selected one set. The terminal apparatus 1 may randomly select one resource from the selected one set.

The base station apparatus 3, based on a resource that the base station apparatus 3 has received a system information request, may transmit an SI type corresponding to the resource. The base station apparatus 3, based on a set of resources to which a resource that the base station apparatus 3 has received a system information request corresponds, may transmit an SI type corresponding to the set.

A resource to which a system information request is transmitted may be common to multiple terminal apparatuses 1. Information for indicating the resource to which the system information request is transmitted may be included in non-demand SI common to the multiple terminal apparatuses 1.

An SI type (information block) to which a system information request corresponds may be decided by combining the above-described multiple methods. For example, an SI type (information block) to which a system information request corresponds may be decided by a value of a message (information bit), a preamble index, a physical route sequence index u, a cyclic shift $C_v$, and some or all of resources to which the system information request is transmitted.

The terminal apparatus 1 may select one set from multiple sets of resources for transmitting a system information request, at least based on an identifier detected based on the NX-SS (for example, a PCI of a cell, an identifier of the base station apparatus 3), an identifier of the terminal apparatus 1, and/or a value that the terminal apparatus 1 stores in advance. The terminal apparatus 1 may select one resource from the selected one set. The terminal apparatus 1 may randomly select one resource from the selected one set. A value that the terminal apparatus 1 holds in advance may be a value that is stored in a memory in advance that the terminal apparatus 1 can read from.

A system information request may include an identity or identifier of the terminal apparatus 1, an identity or identifier indicated by non-demand SI, and/or information for indicating a geographical position of the terminal apparatus 1. The base station apparatus 3 may transmit system information only in a specific area of a cell, based on reception of the system information request.

Hereinafter, retransmission of a system information request will be described.

Figure 6:
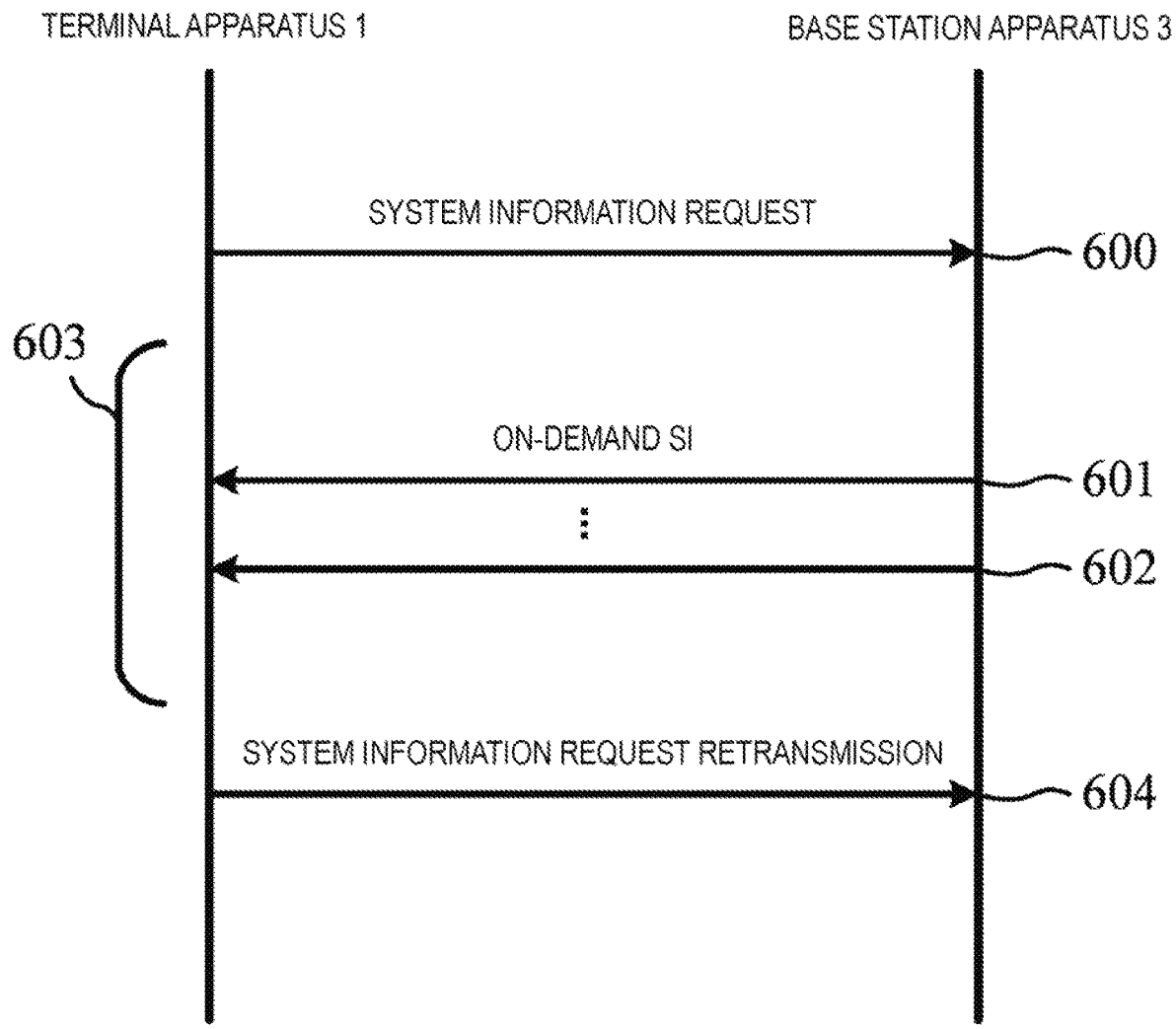
FIG. 6 is a sequence diagram illustrating an example of a retransmission process of the system information request in the present embodiment.

FIG. 6 is a sequence diagram illustrating an example of a retransmission process of a system information request in the present embodiment. In 600, the terminal apparatus 1 transmits a system information request to a cell (base station apparatus 3). In 601, the base station apparatus 3 transmits, based on reception of the system information request, during a monitoring window 603, on-demand SI corresponding to the system information request. In 602, the base station apparatus 3 may retransmit the on-demand SI, during the monitoring window 603.

The monitoring window 603 is a duration in which the terminal apparatus 1 monitors on-demand SI. The monitoring of on-demand SI may denote an attempt to decode on-demand SI or the NX-PDSCH including on-demand SI. The monitoring of on-demand SI may denote an attempt to decode the NX-PDCCH in accordance with downlink control information used for scheduling on-demand SI.

The terminal apparatus 1 may not necessarily monitor on-demand SI, in some subframes during the monitoring window 603. The terminal apparatus 1 may monitor on-demand SI, in subframes other than the some subframes during the monitoring window 603. The base station apparatus 3 may not necessarily transmit on-demand SI, in some subframes during the monitoring window 603. The base station apparatus 3 may transmit on-demand SI, in subframes other than the some subframes during the monitoring window 603. Information for indicating the some subframes and the subframes other than the some subframes may be included in non-demand SI.

In 604, the terminal apparatus 1, in a case that all pieces of on-demand SI to which the system information request corresponds cannot be decoded successfully during the monitoring window 603, retransmits the system information request. The terminal apparatus 1, in a case that all pieces of on-demand SI to which the system information request corresponds are decoded successfully during the monitoring window 603, does not retransmit the system information request.

The terminal apparatus 1 may count transmission times of the system information requests. The terminal apparatus 1 may count retransmission times of the system information requests. The transmission times may be managed by a counter. The terminal apparatus 1 may not necessarily reset the counter, even in a case that an SI type requested to a cell (base station apparatus 3) is changed. The terminal apparatus 1 may reset the counter, in the case that the SI type requested to the cell (base station apparatus 3) is changed. The terminal apparatus 1 may reset the counter, only in a case that the SI type requested to the cell (base station apparatus 3) is changed to a specific SI type. The terminal apparatus 1 may decide whether to reset the counter, based on SI type to which the SI type requested to the cell (base station apparatus 3) is changed. The terminal apparatus 1, in a case that all pieces of on-demand SI to which the system information request corresponds are decoded successfully, may reset the counter to zero. The terminal apparatus 1, immediately before performing initial transmission of system information request information, may reset the counter to zero.

The terminal apparatus 1 may start a timer based on the initial transmission of the system information request. The terminal apparatus 1 may not necessarily restart the counter, even in the case that the SI type requested to the cell (base station apparatus 3) is changed. The terminal apparatus 1 may restart the timer, in the case that the SI type requested to the cell (base station apparatus 3) is changed. The terminal apparatus 1 may restart the timer, only in the case that the SI type requested to the cell (base station apparatus 3) is changed to a specific SI type. The terminal apparatus 1 may decide whether to restart the timer, based on SI type to which the SI type requested to the cell (base station apparatus 3) is changed. The terminal apparatus 1 may retransmit the system information request while the timer is running. The terminal apparatus 1 may not necessarily retransmit the system information request while the timer is not running. The terminal apparatus 1, in the case that the all pieces of on-demand SI to which the system information request corresponds are decoded successfully, may stop the timer.

The terminal apparatus 1, in a case that transmission times of the system information requests reach a prescribed value (maximum value), or in a case that the above-described timer expires, may perform some or all of the following process A, process B, and process C.

Process A: A cell selection procedure is started

Process B: Transmission failure of a system information request, reception failure of on-demand SI, update failure of on-demand SI, establishment failure of an RRC connection, and/or Radio Link Failure (RLF) are notified to higher layers of the terminal apparatus 1

Process C: Transmission failure of a system information request, reception failure of on-demand SI, and/or update failure of on-demand SI are reported to a cell (base station apparatus 3)

The terminal apparatus 1 in RRC_IDLE, in the case that the transmission times of the system information requests reach the prescribed value (maximum value), or in the case that the above-described timer expires, may perform the process A and the process B, and may not necessarily perform the process C. The terminal apparatus 1 in RRC_CoNNECTED, in the case that transmission times of the system information requests reach the prescribed value (maximum value), or in the case that the above-described timer expires, may perform the process C, and may not necessarily perform the process A and the process B.

Information associated with a configuration of the above-described prescribed value (maximum value), and information associated with a configuration of the above-described timer may be included in non-demand SI. The information associated with the configuration of the above-described prescribed value (maximum value) may indicate the above-described prescribed value (maximum value). The information associated with the configuration of the above-described timer may indicate a length of the above-described timer.

The above-described prescribed value (maximum value) and the length of the above-described timer may be predetermined by a specification or the like. The above-described prescribed value (maximum value) may be one.

Higher layers of the terminal apparatus 1 in RRC_IDLE may store that a cause of RLF is transmission failure of a system information request, reception failure of on-demand SI, and/or update failure of on-demand SI. The terminal apparatus 1 whose state is changed from RRC_IDLE to RRC_CONNECTED may report that a cause of RLF is transmission failure of a system information request, reception failure of on-demand SI, and/or update failure of on-demand SI to a cell (base station apparatus 3).

Hereinafter, a monitoring window will be described.

Figure 7:
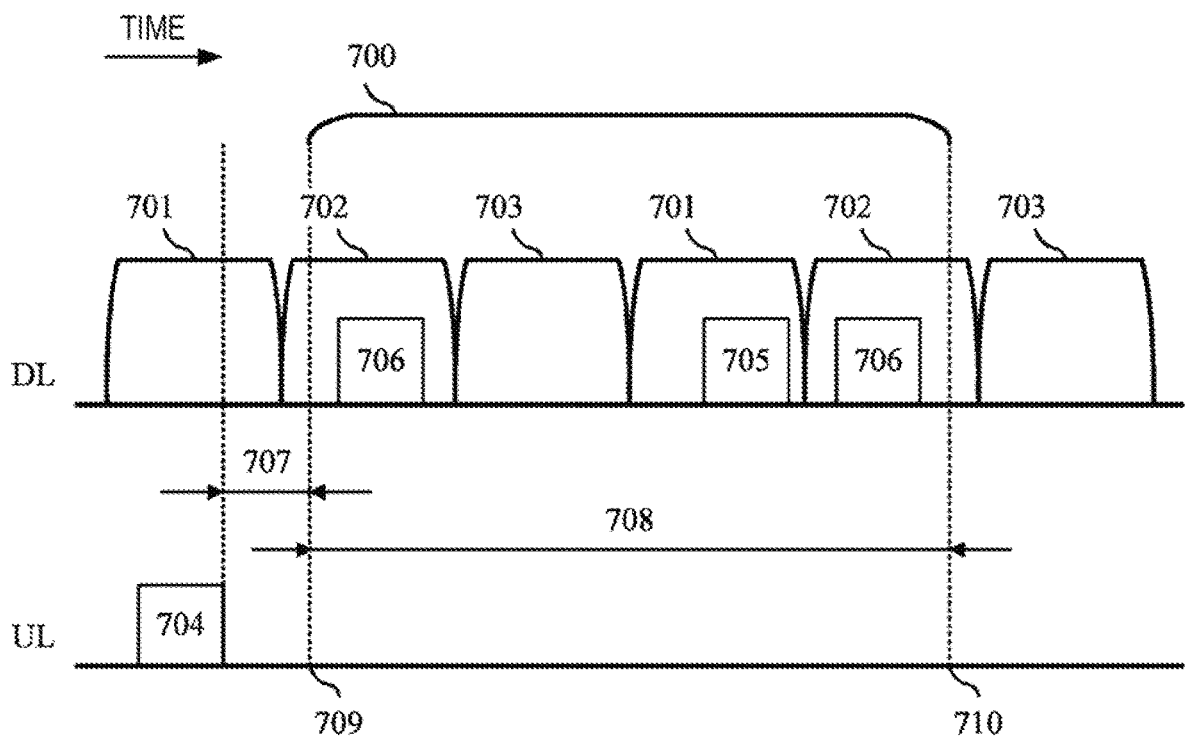
FIG. 7 is a diagram illustrating an example of a monitoring window in the present embodiment.

FIG. 7 is a diagram illustrating an example of a monitoring window in the present embodiment. A start time of a monitoring window 700 may be given by a transmission time of a system information request. 707 denotes a duration between system information request transmission 704 and the monitoring window 700 corresponding to the system information request transmission 704. A length of the duration denoted by the reference sign 707 may be predetermined by a specification or the like. Non-demand SI may include information for indicating the length of the duration denoted by the reference sign 707 and/or information for indicating a length of the monitoring window 700.

A reference sign 701 denotes a window corresponding to a first SI type on-demand SI. A reference sign 702 denotes a window corresponding to a second SI type on-demand SI. A reference sign 703 denotes a window corresponding to a third SI type on-demand SI.

The base station apparatus 3, during the window 701 corresponding to the first SI type on-demand SI, may transmit a first SI type on-demand SI 705. The terminal apparatus 1, during the window 701 corresponding to the first SI type on-demand SI, may monitor the first SI type on-demand SI 705. The base station apparatus 3, during a window 702 corresponding to the second SI type on-demand SI, may transmit a second SI type on-demand SI 706. The terminal apparatus 1, during the window 702 corresponding to the second SI type on-demand SI, may monitor the second SI type on-demand SI 706.

A window corresponding to an Xth SI type on-demand SI may be given by information included in non-demand SI. A duration of the window corresponding to the Xth SI type on-demand SI may be given regardless of a transmission time of a system information request. The duration of the window corresponding to the Xth SI type on-demand SI may be given by a start time, an end time, a window length, a repetition cycle, or the like.

The duration of the window corresponding to the Xth SI type on-demand SI may be given regardless of the transmission time of the system information request.

In FIG. 6, the system information request transmission 704 requests transmission of the first SI type on-demand SI 705 and the second type on-demand SI 706. The terminal apparatus 1, during the monitoring window 700, in a case that the first type on-demand SI 705 and the second type on-demand SI 706 are decoded successfully, may end processing associated with on-demand SI reception. The terminal apparatus 1, during the monitoring window 700, in a case that the first type on-demand SI 705 and the second type on-demand SI 706 are not decoded successfully, may perform processing associated with system information request retransmission.

The monitoring window 700 may be expressed by a monitoring timer. The terminal apparatus 1 may start the monitoring timer at a time 709. The monitoring timer expires at a time 710. The terminal apparatus 1 may perform processing associated with the system information request retransmission, based on the monitoring timer expiration. The terminal apparatus 1, in the case that the first type on-demand SI 705 and the second type on-demand SI 706 are decoded successfully, may stop the monitoring timer, and end the processing associated with on-demand SI reception.

In the present embodiment, the above-described information indicated by the non-demand SI may be indicated by the NX-SS. For example, the above-described information indicated by the non-demand SI may be expressed by an NX-SS sequence, an NX-SS resource, and/or a message (information bit) transmitted together with the NX-SS.

Structures of apparatuses according to the present embodiment will be described below.

Figure 8:
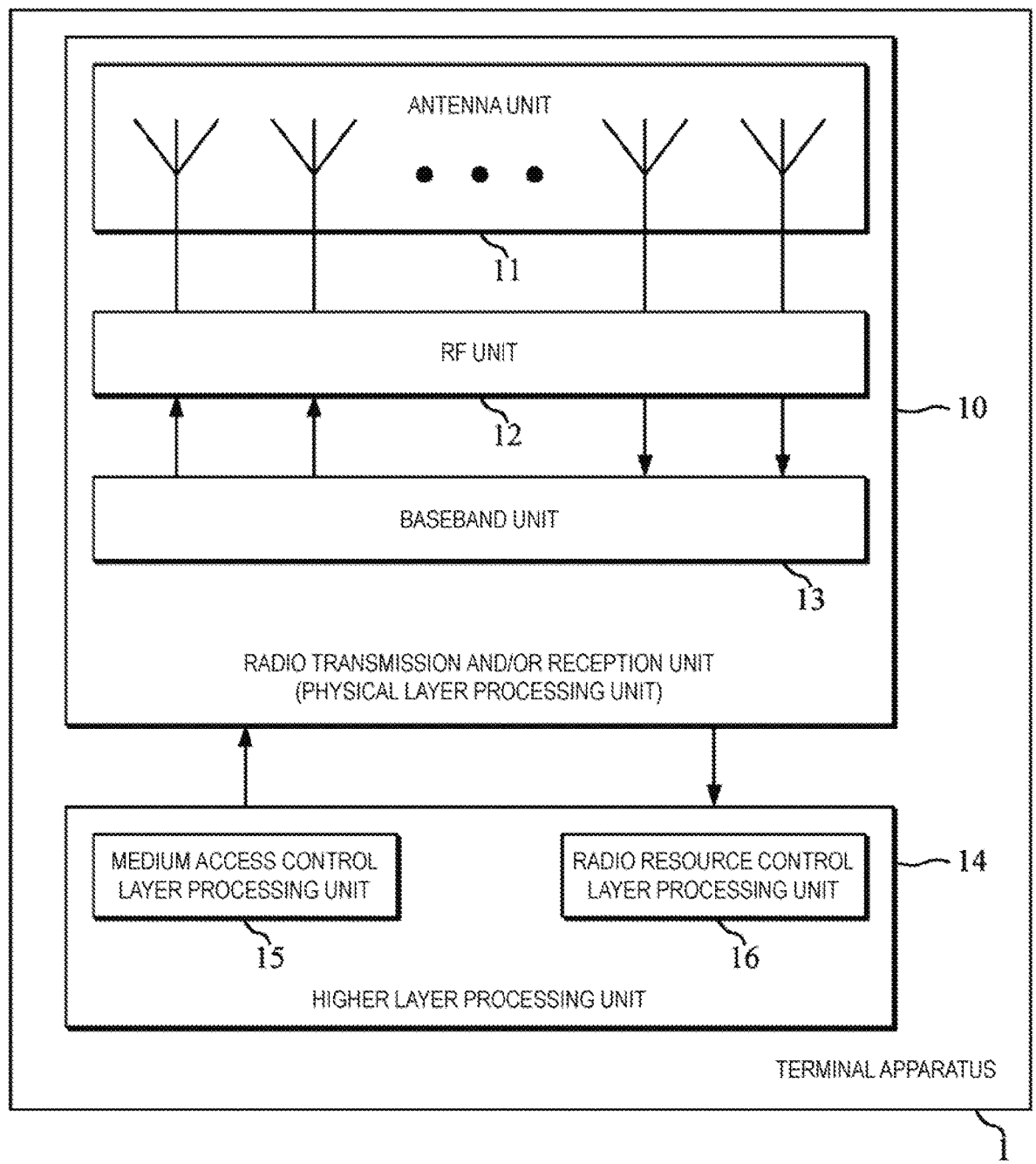
FIG. 8 is a schematic block diagram illustrating a configuration of a terminal apparatus 1 according to the present embodiment.

FIG. 8 is a schematic block diagram illustrating a configuration of a terminal apparatus 1 according to the present embodiment. As illustrated, the terminal apparatus 1 is configured to include a radio transmission and/or reception unit 10 and a higher layer processing unit 14. The radio transmission and/or reception unit 10 is configured to include an antenna unit 11, a Radio Frequency (RF) unit 12, and a baseband unit 13. The higher layer processing unit 14 is configured to include a medium access control layer processing unit 15 and a radio resource control layer processing unit 16. The radio transmission and/or reception unit 10 is also referred to as a transmitter, a receiver, or a physical layer processing unit.

The higher layer processing unit 14 outputs uplink data (transport block) generated by a user operation or the like, to the radio transmission and/or reception unit 10. The higher layer processing unit 14 performs processing of the Medium Access Control (MAC) layer, the Packet Data Convergence Protocol (PDCP) layer, a Radio Link Control (RLC) layer, and the Radio Resource Control (RRC) layer.

The medium access control layer processing unit 15 included in the higher layer processing unit 14 performs processing of the Medium Access Control layer.

The radio resource control layer processing unit 16 included in the higher layer processing unit 14 performs processing of the Radio Resource Control layer. The radio resource control layer processing unit 16 manages the various types of configuration information/parameters of the terminal apparatus 1. The radio resource control layer processing unit 16 sets the various types of configuration information/parameters, based on higher layer signaling received from the base station apparatus 3. That is, the radio resource control layer processing unit 16 sets the various types of configuration information/parameters, based on information indicating the various types of configuration information/parameters received from the base station apparatus 3.

The radio transmission and/or reception unit 10 performs processing of the physical layer, such as modulation, demodulation, coding, and decoding. The radio transmission and/or reception unit 10 demultiplexes, demodulates, and decodes a signal received from the base station apparatus 3, and outputs the information resulting from the decoding to the higher layer processing unit 14. The radio transmission and/or reception unit 10 modulates and codes data to generate a transmit signal, and transmits the transmit signal to the base station apparatus 3.

The RF unit 12 converts (down-converts) a signal received via the antenna unit 11 into a baseband signal by orthogonal demodulation and removes unnecessary frequency components. The RF unit 12 outputs the processed analog signal to the baseband unit.

The baseband unit 13 converts the analog signal input from the RF unit 12 into a digital signal. The baseband unit 13 removes a portion corresponding to a Cyclic Prefix (CP) from the digital signal resulting from the conversion, performs Fast Fourier Transform (FFT) on the signal from which the CP has been removed, and extracts a signal in the frequency domain.

The baseband unit 13 performs Inverse Fast Fourier Transform (IFFT) on data, generates an SC-FDMA symbol, attaches a CP to the generated SC-FDMA symbol, generates a baseband digital signal, and converts the baseband digital signal into an analog signal. The baseband unit 13 outputs the analog signal resulting from the conversion, to the RF unit 12.

The RF unit 12 removes unnecessary frequency components from the analog signal input from the baseband unit 13 using a low-pass filter, up-converts the analog signal into a signal of a carrier frequency, and transmits the final result via the antenna unit 11. Furthermore, the RF unit 12 amplifies power. Furthermore, the RF unit 12 may have a function of controlling transmit power. The RF unit 12 is also referred to as a transmit power controller.

Figure 9:
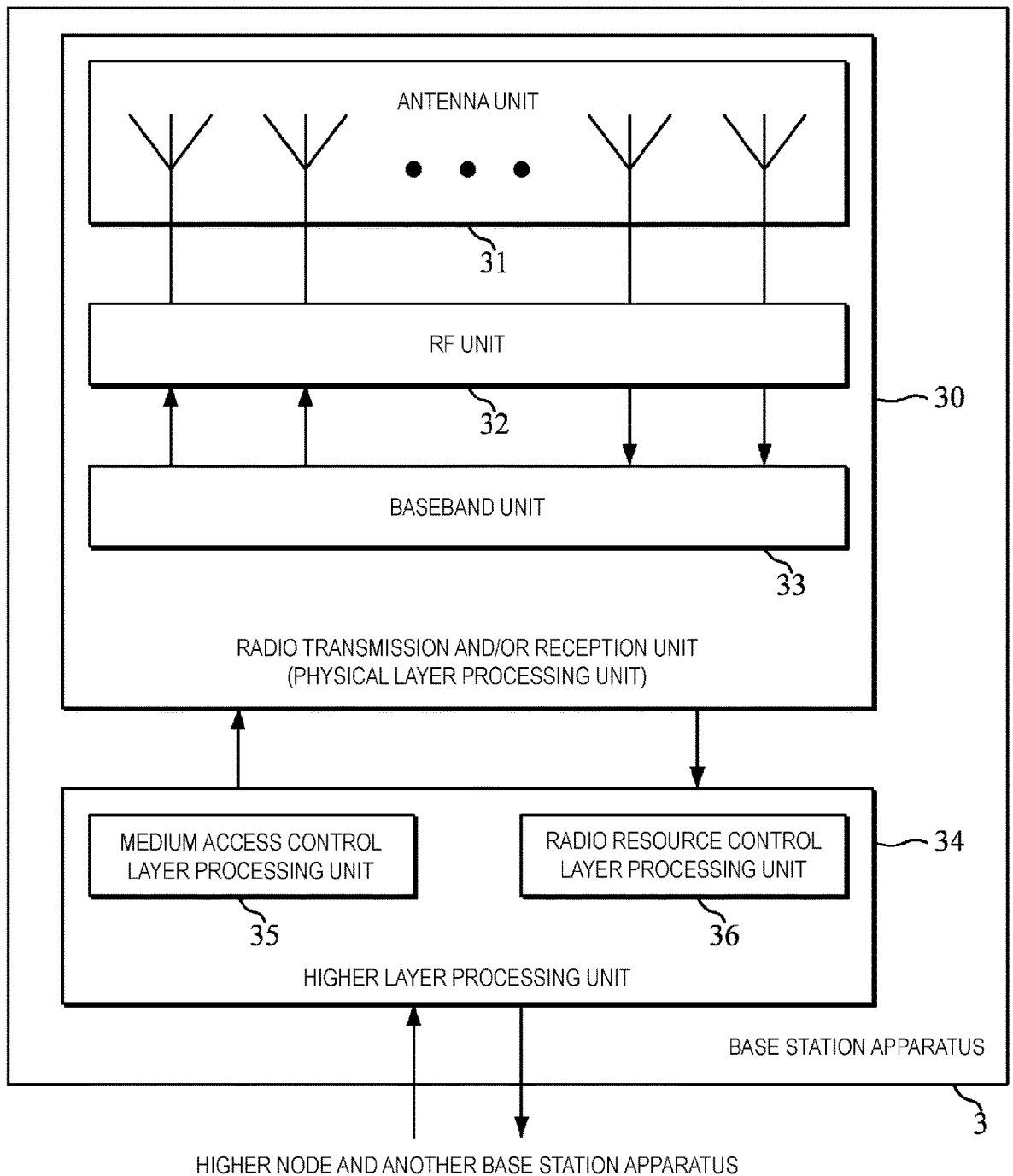
FIG. 9 is a schematic block diagram illustrating a configuration of a base station apparatus 3 according to the present embodiment.

FIG. 9 is a schematic block diagram illustrating a configuration of a base station apparatus 3 according to the present embodiment. As illustrated, the base station apparatus 3 is configured to include a radio transmission and/or reception unit 30 and a higher layer processing unit 34. The radio transmission and/or reception unit 30 is configured to include an antenna unit 31, an RF unit 32, and a baseband unit 33. The higher layer processing unit 34 is configured to include a medium access control layer processing unit 35 and a radio resource control layer processing unit 36. The radio transmission and/or reception unit 30 is also referred to as a transmitter, a receiver, or a physical layer processing unit.

The higher layer processing unit 34 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 35 included in the higher layer processing unit 34 performs processing of the Medium Access Control layer.

The radio resource control layer processing unit 36 included in the higher layer processing unit 34 performs processing of the Radio Resource Control layer. The radio resource control layer processing unit 36 generates, or acquires from a higher node, downlink data (transport block) arranged on a physical downlink shared channel, system information, an RRC message, a MAC Control Element (CE), and the like, and outputs the generated or acquired data to the radio transmission and/or reception unit 30. Furthermore, the radio resource control layer processing unit 36 manages various types of configuration information/ parameters for each of the terminal apparatuses 1. The radio resource control layer processing unit 36 may set various types of configuration information/parameters for each of the terminal apparatuses 1 via the higher layer signaling. In other words, the radio resource control layer processing unit 36 transmits/broadcasts information indicating various types of configuration information/parameters.

The functionality of the radio transmission and/or reception unit 30 is similar to that of the radio transmission and/or reception unit 10, and hence description thereof is omitted.

Each of the units having the reference signs 10 to 16 included in the terminal apparatus 1 may be configured as a circuit. Each of the units having the reference signs 30 to 36 included in the base station apparatus 3 may be configured as a circuit.

Aspects of the terminal apparatus 1 according to the present embodiment will be described below.

(1) A first aspect of the present embodiment is the terminal apparatus 1 that includes a receiver 10 for receiving non-demand SI (System Information) including information for indicating on-demand SI supported by a cell, and a transmitter 10 for transmitting a system information request to request transmission of on-demand SI supported by the cell.

(2) In the first aspect of the present embodiment, the on-demand SI is transmitted based on the system information request, and the non-demand SI is transmitted regardless of the system information request.

(3) A second aspect of the present embodiment is the base station apparatus 3 that includes a transmitter 30 for transmitting non-demand SI (System Information) including information for indicating on-demand SI supported by a cell, and a receiver 30 for receiving a system information request to request transmission of on-demand SI supported by the cell.

(4) In the second aspect of the present embodiment, the on-demand SI is transmitted based on the system information request, and the non-demand SI is transmitted regardless of the system information request.

(5) A third aspect of the present embodiment is the terminal apparatus 1 that includes the receiver 10 for receiving multiple pieces of on-demand SI (System Information), and the transmitter 10 for transmitting a system information request to request transmission of a first piece of on-demand SI among the multiple pieces of on-demand SI.

(6) In the third aspect of the present embodiment, the system information request to request transmission of the first piece of on-demand SI is transmitted in a resource belonging to a first set corresponding to the first piece of on-demand SI among multiple sets of resources for transmitting the system information request.

(7) In the third aspect of the present embodiment, the receiver 10 receives non-demand SI including information for indicating the multiple sets, the multiple sets include at least a first set corresponding to the first piece of on-demand SI, and a second set corresponding to a second piece of on-demand SI, and the non-demand SI is transmitted regardless of the system information request.

(8) In the third aspect of the present embodiment, the system information request to request transmission of the first piece of on-demand SI includes a preamble sequence corresponding to the first piece of on-demand SI.

(9) In the third aspect of the present embodiment, the receiver 10 receives non-demand SI including information for indicating the preamble sequence, and the non-demand SI is transmitted regardless of the system information request.

(10) A fourth aspect of the present embodiment is the base station apparatus 3 that includes the transmitter 30 for transmitting multiple pieces of on-demand SI (System Information), and the receiver 30 for receiving a system information request to request transmission of a first piece of on-demand SI among the multiple pieces of on-demand SI.

(11) In the fourth aspect of the present embodiment, the system information request to request transmission of the first piece of on-demand SI is received in a resource belonging to a first set corresponding to the first piece of on-demand SI among the multiple sets of resources for transmitting the system information request.

(12) In the fourth aspect of the present embodiment, the transmitter 30 transmits non-demand SI including information for indicating the multiple sets, the multiple sets include at least a first set corresponding to the first piece of on-demand SI, and a second set corresponding to a second piece of on-demand SI, and the non-demand SI is transmitted regardless of the system information request.

(13) In the fourth aspect of the present embodiment, the system information request to request transmission of the first piece of on-demand SI includes a preamble sequence corresponding to the first piece of on-demand SI.

(14) In the fourth aspect of the present embodiment, the transmitter 30 receives non-demand SI including information for indicating the preamble sequence, and the non-demand SI is transmitted regardless of the system information request.

(15) A fifth aspect of the present embodiment is the terminal apparatus 1 that includes the transmitter 10 for transmitting a system information request to request transmission of a first piece of on-demand SI among multiple pieces of on-demand SI, and the receiver 10 for monitoring the first piece of on-demand SI based on transmission of a system information request to request transmission of the first piece of on-demand SI, in which the first piece of on-demand SI is monitored during a first window included in a monitoring window, a duration of the monitoring window is at least based on a transmission timing of a system information request to request transmission of the first piece of on-demand SI, the first window is given at least based on information included in non-demand SI, the on-demand SI is transmitted based on the system information request, and the non-demand SI is transmitted regardless of the system information request.

(16) In the fifth aspect of the present embodiment, the first window is given regardless of the transmission timing of the system information request to request transmission of the first piece of on-demand SI.

(17) In the fifth aspect of the present embodiment, a length of the monitoring window is given based on information included in the non-demand SI.

(18) A sixth aspect of the present embodiment is the base station apparatus 3 that includes the receiver 30 for receiving a system information request to request transmission of a first piece of on-demand SI among multiple pieces of on-demand SI, and the transmitter 30 for transmitting the first piece of on-demand SI based on reception of a system information request to request transmission of the first piece of on-demand SI, in which the first piece of on-demand SI is transmitted during a first window included in a monitoring window, a duration of the monitoring window is at least based on a reception timing of a system information request to request transmission of the first piece of on-demand SI, the first window is given at least based on information included in non-demand SI, the on-demand SI is transmitted based on the system information request, and the non-demand SI is transmitted regardless of the system information request.

(19) In the sixth aspect of the present embodiment, the first window is given regardless of a transmission timing of the system information request to request transmission of the first piece of on-demand SI.

(20) In the sixth aspect of the present embodiment, a length of the monitoring window is given based on information included in the non-demand SI.

Accordingly, system information is effectively transmitted.

The base station apparatus 3 according to an embodiment of the present invention can also be achieved as an aggregation (an apparatus group) constituted of multiple apparatuses. Each of the apparatuses constituting the apparatus group may include some or all portions of each function or each functional block of the base station apparatus 3 according to the above-described embodiment. The apparatus group may include each general function or each functional block of the base station apparatus 3. Furthermore, the terminal apparatus 1 according to the above-described embodiment can also communicate with the base station apparatus as the aggregation.

Furthermore, the base station apparatus 3 according to the above-described embodiment may serve as an Evolved Universal Terrestrial Radio Access Network (EUTRAN). Furthermore, the base station apparatus 3 according to the above-described embodiment may have some or all portions of functions of a node higher than an eNodeB.

A program running on an apparatus according to an aspect of the present invention may serve as a program that controls a Central Processing Unit (CPU) and the like, and causes a computer to operate in such a manner as to enable the functions of the above-described embodiment according to an aspect of the present invention. Programs or the information handled by the programs are temporarily read into a volatile memory, such as a Random Access Memory (RAM) while being processed, or stored in a non-volatile memory, such as a flash memory, or a Hard Disk Drive (HDD), and then read by the CPU to be modified or rewritten, as necessary.

Moreover, the apparatuses in the above-described embodiment may be partially enabled by a computer. In such a case, a program for enabling such control functions may be recorded on a computer-readable recording medium to cause a computer system to read and perform the program recorded on the recording medium. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the above-described program may be configured to enable some of the functions described above, and additionally may be configured to enable the functions described above, in combination with a program already recorded in the computer system.

Furthermore, each functional block or various characteristics of the apparatuses used in the above-described embodiment may be mounted or performed on an electric circuit, that is, typically an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or the processor may be a processor of known type, a controller, a micro-controller, or a state machine instead. The general-purpose processor or the above-mentioned circuits may be constituted of a digital circuit, or may be constituted of an analog circuit. Furthermore, in a case that with advances in semiconductor technology, a circuit integration technology appears that replaces the present integrated circuits, it is also possible to use an integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication device of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatus.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of an embodiment of the present invention defined by claims, and embodiments that are made by suitably combining technical means disclosed according to the different embodiments are also included in the technical scope of an embodiment of the present invention. Furthermore, a configuration in which a constituent element that achieves the same effect is substituted for the one that is described in the embodiments is also included in the technical scope of the present invention.

CROSS-REFERENCE OF RELATED APPLICATION

This application claims priority based on JP 2016-019541 filed in Japan on Feb. 4, 2016, and the contents of which are incorporated herein by reference.

REFERENCE SIGNS LIST 1 (1A, 1B, 1C) Terminal apparatus
3 Base station apparatus
10 Radio transmission and/or reception unit
11 Antenna unit
12 RF unit
13 Baseband unit
14 Higher layer processing unit
15 Medium access control layer processing unit 16 Radio resource control layer processing unit
30 Radio transmission and/or reception unit
31 Antenna unit
32 RF unit
33 Baseband unit
34 Higher layer processing unit
35 Medium access control layer processing unit
36 Radio resource control layer processing unit

The invention claimed is:

1. A terminal apparatus, comprising:
a transmitter configured to transmit a system information request to request transmission of a first piece of on-demand SI among multiple pieces of on-demand SI; and
a receiver configured to acquire the first piece of on-demand SI,
wherein the first piece of on-demand SI is monitored during a first window included in a monitoring window,
a start time of the monitoring window is at least based on a transmission timing of the system information request to request transmission of the first piece of on-demand SI, and
the first window is given at least based on information included in non-demand SI,
the non-demand SI being transmitted periodically from a base station.

2. The terminal apparatus according to claim 1, wherein the first window is given regardless of a transmission timing of the system information request to request transmission of the first piece of on-demand SI.

3. The terminal apparatus according to claim 1, wherein a length of the monitoring window is given based on the information included in the non-demand SI.

4. A base station apparatus, comprising:
a receiver configured to receive a system information request to request transmission of a first piece of on-demand SI among multiple pieces of on-demand SI; and
a transmitter configured to transmit the first piece of on-demand SI,
wherein the first piece of on-demand SI is transmitted during a first window included in a monitoring window.

5. A communication method used for a terminal apparatus, the method comprising:
transmitting a system information request to request transmission of a first piece of on-demand SI among multiple pieces of on-demand SI; and
acquiring the first piece of on-demand SI,
wherein the first piece of on-demand SI is monitored during a first window included in a monitoring window,
a start time of the monitoring window is at least based on a transmission timing of the system information request to request transmission of the first piece of on-demand SI, and
the first window is given at least based on information included in non-demand SI,
the non-demand SI being transmitted periodically from a base station.

6. The communication method according to claim 5, wherein the first window is given regardless of a transmission timing of the system information request to request transmission of the first piece of on-demand SI.

7. The communication method according to claim 5, wherein a length of the monitoring window is given based on the information included in the non-demand SI.

8. A communication method used for a base station apparatus, the method comprising:
receiving a system information request to request transmission of a first piece of on-demand SI among multiple pieces of on-demand SI; and
transmitting the first piece of on-demand SI,
wherein the first piece of on-demand SI is transmitted during a first window included in a monitoring window.

* * * * *